May 23, 1950     P. BELGERI     2,508,349

THERMOSTATIC REGULATOR FOR ELECTRIC HEATING ELEMENTS

Filed Feb. 17, 1948

Inventor:
P. Belgeri
By E. F. Otendoroth
atty

Patented May 23, 1950

2,508,349

UNITED STATES PATENT OFFICE 2,508,349

THERMOSTATIC REGULATOR FOR ELECTRIC HEATING ELEMENTS

Paul Belgeri, Geneva, Switzerland, assignor to Brevets et procédés Pyror S. A., Geneva, Switzerland, a corporation of Switzerland Application February 17, 1948, Serial No. 8,987
In Switzerland February 21, 1947

4 Claims. (Cl. 200—122)

This invention relates to a thermostatic regulator for electric heating bodies, in which the deformations of a thermocouple are used to operate at least one mercury switch controlling the circuit of the said heating body. The regulator is characterized in that the said switch is mounted on an oscillating member the movement of which is controlled by the deformations of the thermostat by means of a flexible connection whose active length is adjustable for the purpose of modifying the period of time intervals between the periodic closing and opening of the said switch.

The accompanying drawing shows, by way of example, an embodiment of the regulator according to the invention.

Figure 1:
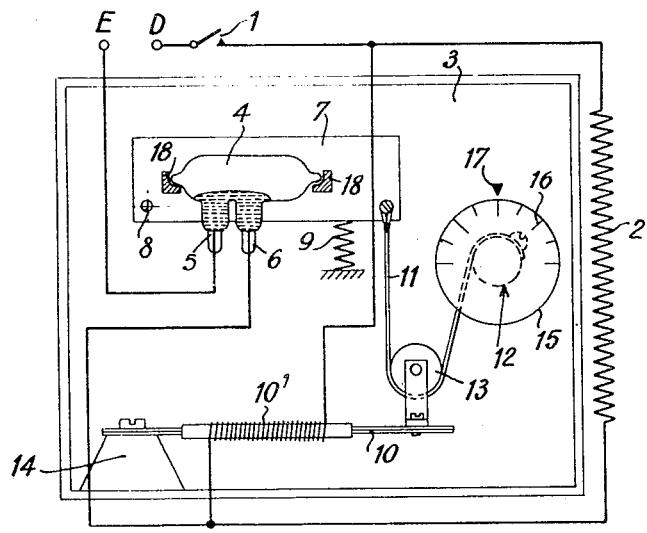
Fig. 1 is a diagrammatic view of this embodiment.

The object of the regulator according to the invention is to control a heating power (such as that of an electric heating body) by periodic interruptions of the current, the alternating periods of interruption and operation being automatically determined by the deformations of a thermostatic member such as a bi-metallic member, for example, having a winding inserted in the controlled circuit (for example the circuit of the heating element). 1 indicates a general hand operated switch, inserted between a terminal D of a current supply from the network, for instance, and the heating element of a heating apparatus shown as an electric resistance 2. The regulator proper 3 includes a mercury switch 4 the electrodes of which 5 and 6 are respectively connected to the terminal E of the network and to the heating resistance 2. This switch 4 bears on two bearings 17 mounted on a support 7 capable of oscillating about an axis 8 pertaining to the frame of the regulator 3. A spring 9 tends to retain the support 7 in its normal position corresponding to the closing of the switch 4 through the mercury. The movement of the support 7 is controlled by the deformations of a bi-metallic member 10 by means of a flexible connection 11 the length of which is adjustable. One end of this connection 11 is secured to the oscillating support 7 and the other end to a rotatable member 12, for example a drum or a rod, about which it is adjustably wound in order to vary its active length, the intermediate part of this connection passing round a pulley 13 integral with the movable end of the bi-metallic element 10. The flexible connection 11 might also slide in a groove integral with the movable end of the element 10. The other end of the element 10 is secured to a stand 14 integral with the frame of the regulator 3. The rotatable member 12 is hand operated by means of a knob 15 provided with a scale 16 moving in front of a fixed guide mark 17. Inversely, the guide mark might be movable and the scale fixed.

Although in the regulator described, the heating resistance 10' of the element 10 is connected in parallel with the heating resistance 2 of the apparatus to be controlled, it could also be connected in series with this resistance 2 which would thus vary the control of the intensity of heating as will hereinafter be described.

The operation of the regulator described is as follows:

Supposing the switch 1 to be closed, the current flows, for example from D to E passing through the heating resistance 2, the resistance 10' for heating the bi-metallic element 10 and the mercury connecting the electrodes 5 and 6. The movable end of the element 10 moves under the effect of heat produced by the passage of the current through resistance 10' and, by means of the pulley 13, exerts a pull on the connection 11. This pull, acting in opposition to the spring 9, causes the support 7 to oscillate thus bringing about the breaking of the circuit between the electrodes 5 and 6 and, consequently, the interruption of the current through resistances 2 and 10'.

If a rapid action of the bi-metallic element on the oscillating support 7 is desired, the connection 11 will be wound round the member 12 by means of the knob 15 so as to change the position of rest of the support 7. The initial deformations of the element 10 will then require a very short time before acting on the oscillating support 7 of the switch 4. On the other hand, if the connection 11 is unwound by turning the knob 15 in a contrary direction, the initial deformations of the element 10 will first of all serve to stretch the connection 11 and will therefore take a certain time before acting on the support 7.

Moreover, any other mechanical means might be resorted to in order to produce a variation in tension of the flexible connection 11 by turning the knob 15.

It will be noted that the control realized by the regulator described (expressed in percentage of the heating power) is not a function directly proportional to the angular displacements of the adjusting knob 15.

Figure 2:
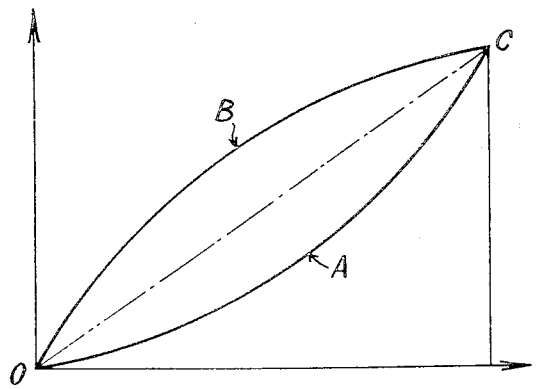
Fig. 2 is a diagram showing two adjustments of the temperature of the working apparatus.

In the diagram shown in Fig. 2, the ordinates correspond to the percentage of the heating power and the abscissae to the angular displacements of the adjusting knob 15.

The curve A shows, for example, that the heating of the working apparatus increases slowly at the outset and more rapidly towards the end of the angular displacement of the knob 15. The adjustment is therefore more sensible at low intensities, which is of importance in case the intensity of the source of heat must be that corresponding to the simmering of a dish, for example. On the other hand, this advantage is turned into a disadvantage if the intensity of the source of heat must be that of an oven. In this case, the shape of the curve must be similar to that of curve B (Fig. 2) that is to say that the adjustment must be more sensible at the upper part of the curve. The intersecting point C of the curves A and B corresponds to 100% of the heating power.

By connecting the heating resistance 10' of the bi-metallic element in series with the heating resistance 2 of the working apparatus, the control shown by the curve B is realized and by connecting this resistance 10' in parallel with the resistance 2, the control realized is the one shown by the curve A.

What I claim is:

1. A thermostatic regulator comprising a support oscillatably mounted, a two-electrode mercury switch mounted on said support, means normally holding said support in a normal position whereby said mercury switch is in closed position, a bi-metallic element, energizing means for said element, a flexible connection between said element and said oscillatable support, manual means for varying the length of said flexible connection, said flexible connection being operated by said element to oscillate said support and said switch against action of said holding means for making and breaking contact in said switch, the length of said connection regulating the frequency of operation of said switch.

2. In a thermostatic regulator as claimed in claim 1, an end of said flexible connection being secured to said oscillatable support, a rotatable member, the opposite end of said flexible connection being wound about said rotatable member, the amount of said connection wound on said rotatable member being adjustable to vary the length of said connection, and an intermediate portion of said connection cooperating with a free movable end of said bi-metallic element.

3. In a thermostatic regulator as claimed in claim 2, a holding member secured to the free movable end of said bi-metallic element, said intermediate portion of said flexible connection slidably engaging said holding member.

4. In a thermostatic regulator as claimed in claim 3, said holding member consisting of a pulley, said intermediate portion of said connection passing around said pulley.

PAUL BELGERI.

REFERENCES CITED

The following references are of record in the file of this patent:

UNITED STATES PATENTS

| Number | Name | Date |
|---|---|---|
| 1,651,629 | Phelan | Dec. 6, 1927 |
| 1,928,907 | Noble | Oct. 3, 1933 |
| 2,012,428 | Hollinshead | Aug. 27, 1935 |
| 2,088,728 | Stranszky | Aug. 3, 1937 |
| 2,224,596 | Desfachelles | Dec. 10, 1940 |